June 24, 1930.

F. CHARAVAY

PROPELLER VENTILATING MEANS

Re. 17,709

Original Filed March 27, 1926

INVENTOR

BY Frederick Charavay

Horace P. Smith

His ATTORNEY

Reissued June 24, 1930 Re. 17,709

UNITED STATES PATENT OFFICE

FREDERICK CHARAVAY, OF PIQUA, OHIO, ASSIGNOR, BY MESNE ASSIGNMENTS, OF ONE-HALF TO HARTZELL INDUSTRIES, INC., OF PIQUA, OHIO, A CORPORATION OF DELAWARE

PROPELLER-VENTILATING MEANS

Original No. 1,657,496, dated January 31, 1928, Serial No. 98,045, filed March 27, 1926. Application for reissue filed January 8, 1930. Serial No. 419,445.

This invention relates to new and useful improvements in propeller ventilating means.

It is one of the principal objects of my invention to provide for rooms, halls and auditoriums a propeller fan which will not only improve the ventilation of them, but which, being of aerofoil section, will run with less current cost and greater efficiency than the ordinary electric fan.

It is another object of my invention to provide in front of the propeller, an air discharge opening of less diameter than the propeller so that the air forced through the opening by the propeller will not return to destroy the vacuum behind it.

My propeller and restricted air-discharge means in front of it are admirably adapted for use in pulling warm air through a kiln for drying lumber or other material, since the restricted air-discharge opening will not permit the air to return through it for entrance behind the propeller to destroy the vacuum which enables the propeller to pull or exhaust the air from the kiln drying room.

Other important and incidental objects will be brought out in the following specification, and particularly set forth in the subjoined claims.

In the accompanying drawings illustrating my invention,

Figure 1:
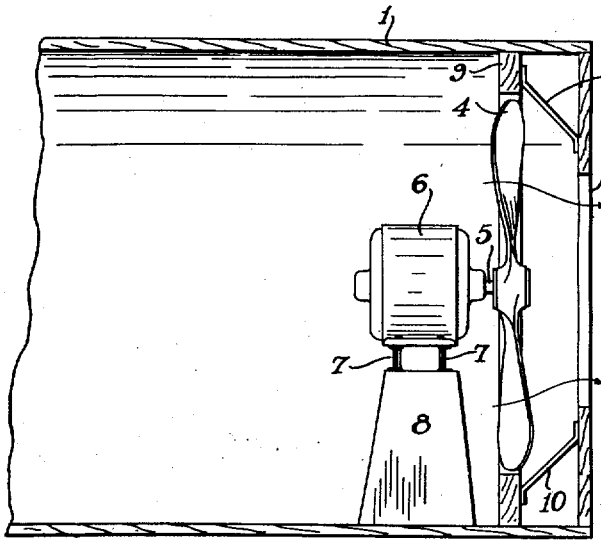
Figure 1 is a side view of my propeller fan, with the enclosing casing in section, showing the air-discharge opening of less diameter than the propeller in front of the latter.
Figure 2:
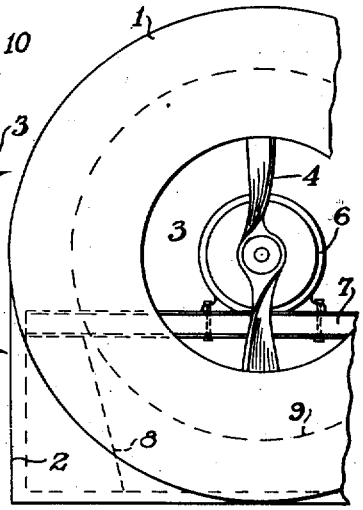
Figure 2 is a partial front view of the same.

Referring to the accompanying drawings for a detailed description of my invention, the numeral 1 designates a cylindrical casing having a square base portion 2. This casing 1, which may be of any suitable form, is itself, or through an intermediate passage (not shown), in communication with a room, hall or auditorium for the purpose of exhausting air therefrom.

Formed in the front wall of the casing 1 is a circular air-discharge opening 3. Immediately behind this opening 3, and of greater diameter than the latter, is a propeller 4 having an aerofoil section. This propeller is fixedly secured to the armature shaft 5 of an electric motor 6, although it may be operated from the latter or other prime mover through intermediate means (not shown). In the present instance the motor 6 is mounted on two I beams 7, 7 that are supported by end piers 8, 8. While I have shown these means of solidly mounting the propeller so as not to interfere with the flow of air to it, any other suitable means may be employed for this purpose if desired.

The propeller 4 rotates in a circular opening of slightly greater diameter formed in a partition 9. Between the latter and the front wall of the casing 1, axially inclined braces 10 are secured. (See Figure 1.)

When rotated by the motor 6, the propeller 4 will run at low current cost to discharge air through the restricted orifice 3 in a full, continuous and easy flowing stream. The orifice 3, being of less diameter than the propeller, will prevent the air from returning through it for entrance behind the propeller to destroy the vacuum and thereby to lessen the pull which the propeller exerts upon the air at its rear. Consequently, assisted by an unimpaired vacuum behind it, and aided by its own peculiar constructions, my propeller will continuously, efficiently and with great force withdraw air from a room, hall or auditorium.

Figure 3:
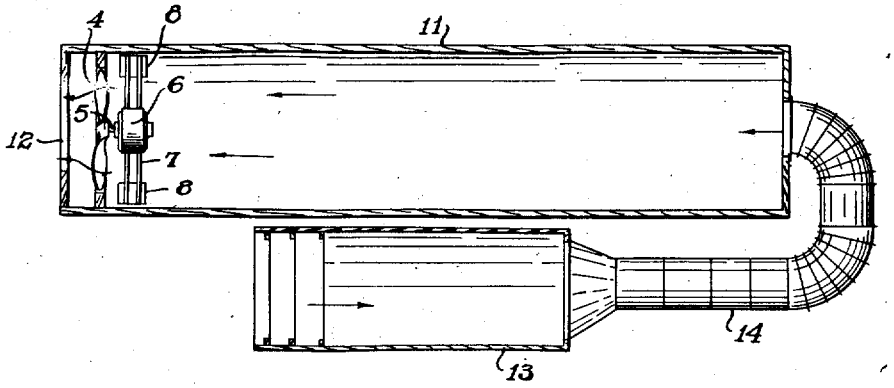
Figure 3 is a horizontal, sectional view taken through a drying-kiln room, showing how my propeller pulls the warm, dry air therethrough.

In Figure 3 I have shown my propeller 4 placed in the front part of a kiln-drying room 11, and immediately behind an air-discharge opening 12 of less diameter than the propeller formed in the front wall of the room. When the propeller 4 is rotated by the motor 6, which has a mounting similar to that shown in Figure 1, warm dry air will be drawn from a drying chamber 13 through a pipe or passage 14 into the rear end of the room 11, and through it, as indicated by the arrows in Figure 3. Lumber or other material placed in this room will be thoroughly dried by the full, continuous and uninterrupted stream of warm air pulled over it by the propeller 4, since the orifice 12 in front of it, being of less diameter, will not permit any air to return for entrance behind the propeller, thereby to destroy the vacuum and lessen the pull exerted by the propeller upon drying air. This is accomplished by screening the propeller tips.

My invention may be accomplished by the use of an aerofoil section propeller commonly employed in airplanes in combination with an enclosure closely adjacent to and extending across the ends of the propeller blades and adjacent to and down a part of the sides of the propeller blades so as to provide an annular enclosure for the tips of the propeller blades, thereby eliminating from consideration the air that is delivered radially from the tips and the eddies of air set up thereby, which would otherwise cause air to return for entrance behind the propeller reducing its efficiency. By thus eliminating the disadvantages of the aerofoil propeller through the use of the annular screen of its tips and utilizing the central portion of high efficiency I am enabled to utilize the aerofoil propeller as an air-moving means within an enclosure.

The return of air across the tips is prevented by having the blades travel reasonably close to the vertical face of the vertical partition that extends downwardly across the tips of the propeller blades forming an exit opening of smaller diameter than the propeller. This is of the essence of my invention. By "annular member" I am referring to the part in the drawings marked 1; by the term "apertured disk" or "apertured plate", I am referring to the part which has the opening 3 therein.

An aerofoil propeller is one involving the use of aerofoil sections instead of flat blades of substantially uniform thickness. An aerofoil section is a streamline body whose maximum thickness is located approximately one-third the distance from the leading edge and recedes from this maximum thickness to both the leading and the trailing edges in such a manner that the aerofoil section of the propeller will permit its passage through the air with a minimum amount of disturbance.

I do not wish to be limited to the details of construction and arrangement herein shown and described, and any changes or modifications may be made therein within the scope of the subjoined claims.

Having described my invention, I claim:

1. An enclosure to be ventilated having an air discharge opening, a partition in said enclosure behind said opening and having a circular hole larger than said opening and through which air can only pass to it, and a fan of larger diameter than the opening in said enclosure, said fan being mounted for rotation in said partition hole and having a diameter slightly less than said hole to prevent back draft.

2. In combination, an annular member, an apertured disk, joined together to form an angular enclosure, and an air foil propeller the tips of which are enclosed within the angle of the enclosure sufficiently close to prevent back draft.

3. In combination, an annular member, an apertured disk, joined together to form an angular enclosure, and an air foil propeller the tips of which are enclosed within the angle of the enclosure sufficiently close to prevent back draft, and means for relatively positioning said propeller and a motor with respect to the annular member and apertured disk.

4. In combination, an annular member, an apertured disk, joined together to form an angular enclosure, and an air foil propeller the tips of which are enclosed within the angle of the enclosure sufficiently close to prevent back draft, said apertured disk having a restricted aperture of lesser diameter than the propeller diameter.

5. In combination, an air foil section propeller having axial delivery of air and a radial delivery of air from the tips of said propeller, an annular member enclosing the tips of said propeller and an apertured disk on one side of the propeller whereby the radial delivery of air is prevented from impeding the flow of air delivered axially.

6. In combination, an air foil propeller and means surrounding the ends and one side of the tips of said propeller closely adjacent to said tips whereby return air flow is prevented from impeding axial air flow from the center of the propeller.

7. In combination, an air foil propeller and an apertured plate on the outlet side of the propeller the plane of said plate being parallel to the plane of rotation of the propeller forming a screen for the tips of the propeller, said plate having a central opening adjacent the central portion of the propeller of lesser diameter than the maximum diameter of the propeller and sufficiently close to the propeller tips to prevent back draft into the tips.

FREDERICK CHARAVAY.